Figure 4:
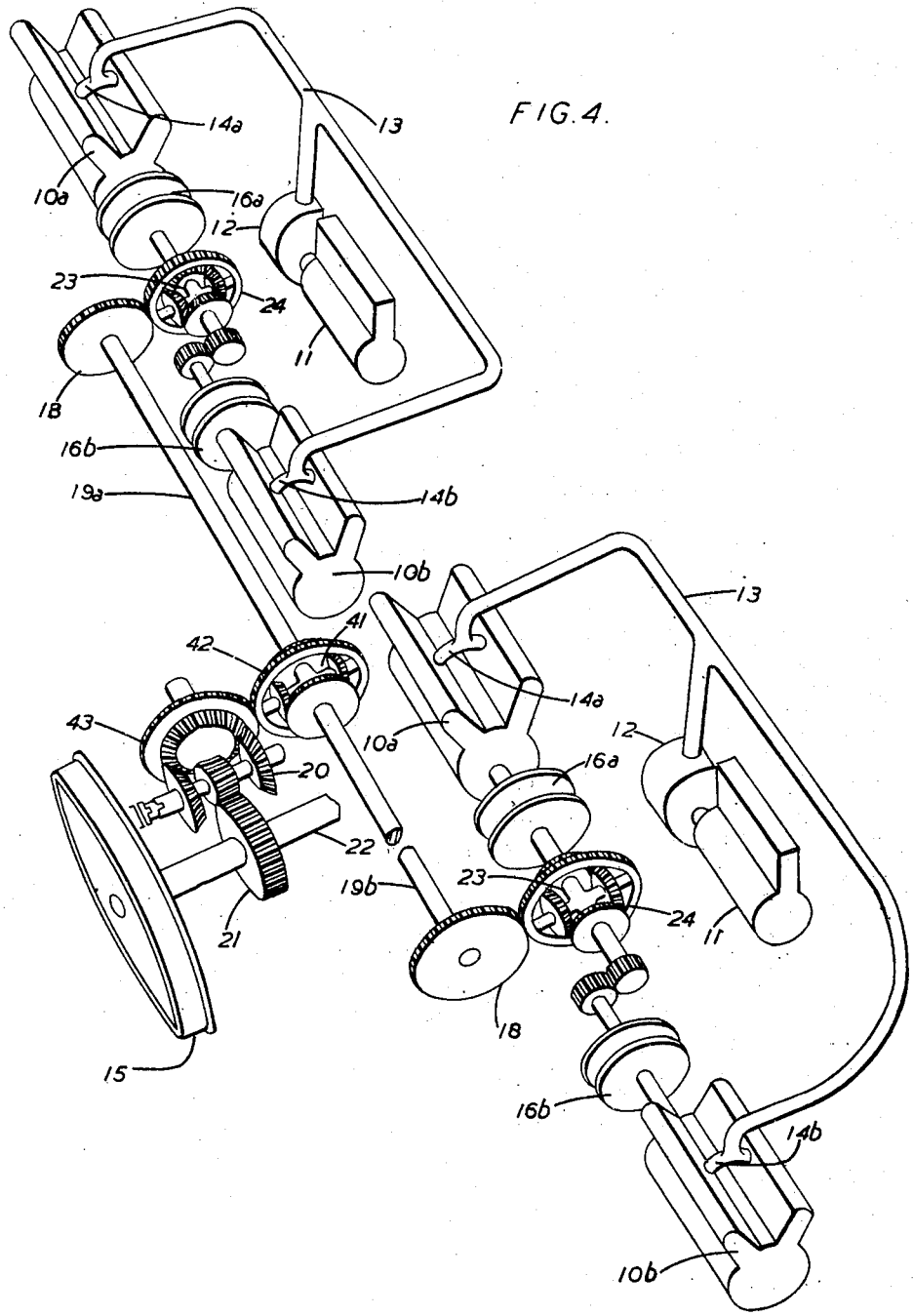

Aug. 4, 1953
L. F. R. FELL
2,647,372
INTERNAL-COMBUSTION ENGINE POWER UNIT FOR LOCOMOTIVES
Filed Aug. 29, 1946
3 Sheets-Sheet 1
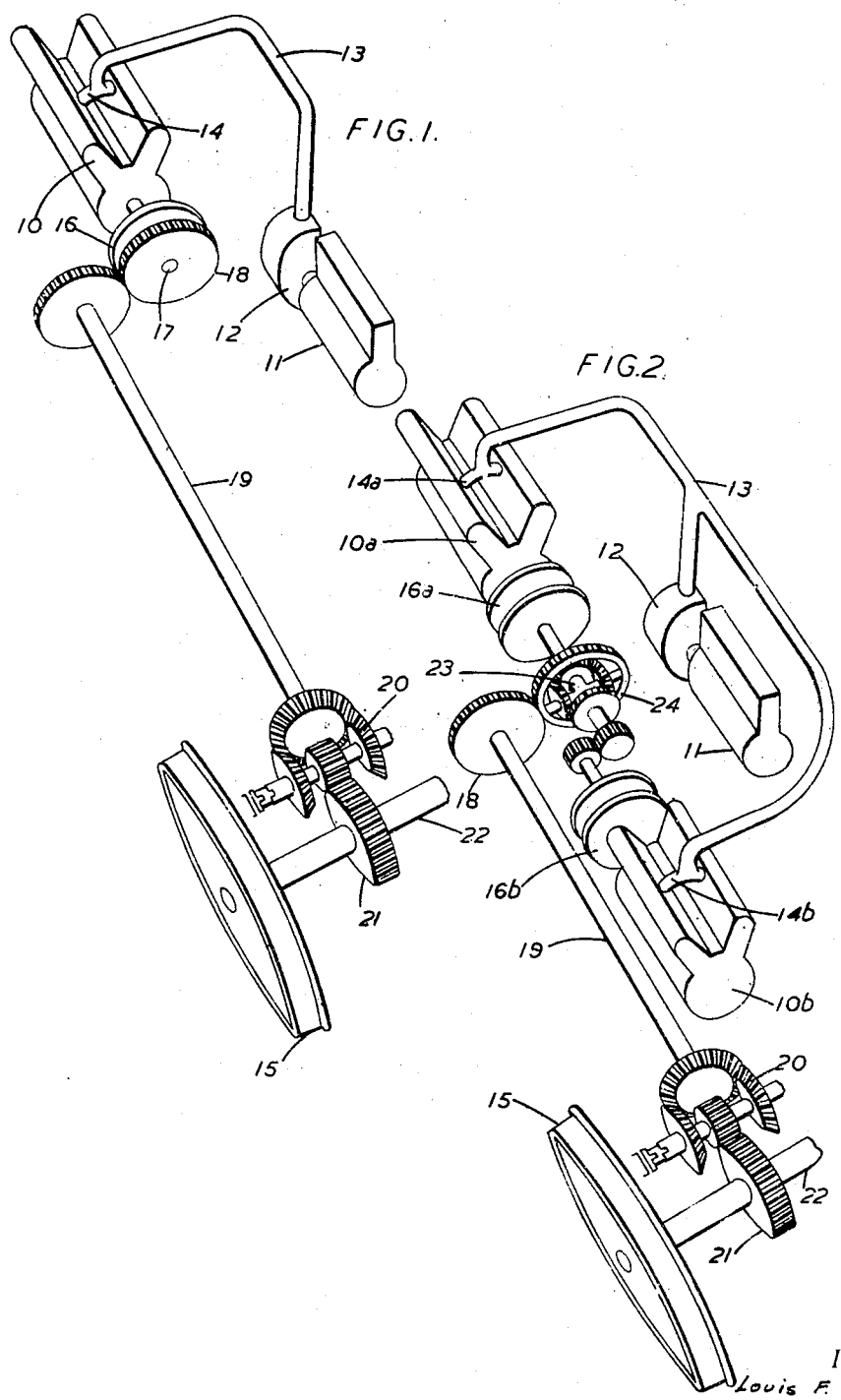
Inventor
Louis F. R. Fell
By
Emery, Holcombe & Blair
Attorney

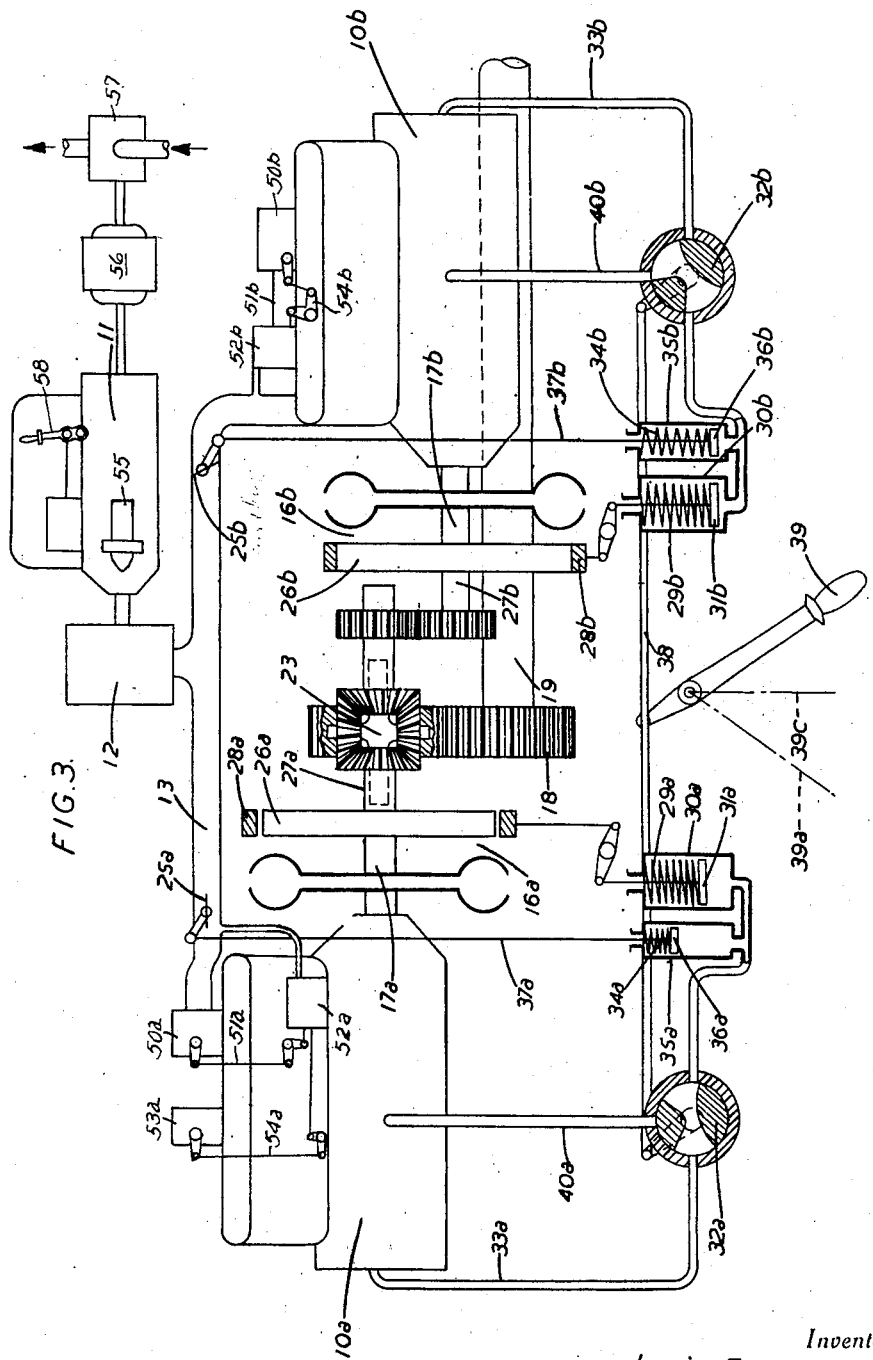

Patented Aug. 4, 1953

2,647,372

UNITED STATES PATENT OFFICE 2,647,372

INTERNAL-COMBUSTION ENGINE POWER UNIT FOR LOCOMOTIVES

Louis Frederick Rudston Fell, Littleover, England, assignor to Fell Developments Limited, London, England, a British company Application August 29, 1946, Serial No. 693,613
In Great Britain August 29, 1945

7 Claims. (Cl. 60—97)

This invention concerns improvements in or relating to power units for locomotives and has for its object to provide a power unit which will be capable of operating at a substantially constant power output and in which the driving torque is variable within the required limits over the running speed range of the locomotive without the necessity of providing change speed gears or electric transmission or other form of torque multiplier between the power unit and the driving wheels of the locomotive.

According to the present invention a power unit for a locomotive comprises an internal-combustion engine for driving the locomotive (hereinafter called the main engine) the fuel supply of which main engine is varied automatically with variations in the air supply, an auxiliary internal combustion engine, a blower driven by the auxiliary engine and supplying the main engine with air and a control for the auxiliary engine to vary the output of the blower whereby the power developed by the main engine is maintained substantially constant throughout its running speed range and the engine torque diminishes as the speed increases within said range, the main engine being connected to the driving wheels of the locomotive through the agency of a fluid coupling, or clutch with similar characteristics, whose effective range of speed variation corresponds to the operating speed range of the main engine, slipping of the coupling taking place below the running speed range thereof.

The ignition timing of the main engine may be automatically varied with variations in the output of the blower or by the rotational speed of the main engine. It will be understood that the actual means provided for the automatic variation of fuel supply and ignition timing to the main engine are determined by the type of engine employed and that the automatic fuel supply means employed in the case of homogeneous charge type engines such as fuel-air control associated with a carburetor, would need adaptation in the case of compression ignition engines where some sort of pneumatic fuel control actuated by the air inlet pressure to the engine would clearly be appropriate. It will also be understood that in relation to compression ignition engines it is more appropriate to speak of injection timing as the counterpart of ignition timing which applies more particularly to homogeneous charge type engines.

A specific embodiment of the present invention will now be described by way of example with reference to the accompanying drawings, and whereas this embodiment is more particularly applicable to homogeneous charge type engines it should not be regarded as restricted to this type of engine and indeed could find application in connection with compression ignition type engines provided suitable automatic fuel control means such as pneumatic fuel control actuated by air inlet pressure are incorporated.

Figure 1 is a diagrammatic perspective view of a power unit for a locomotive constructed in accordance with the present invention, Figure 2 is a similar view showing another construction in accordance with the invention, Figure 3 is a schematic drawing showing the controls which are associated with the power unit shown in Figure 2, and Figure 4 is a perspective view showing yet another construction of power plant in accordance with the present invention.

Referring to Figure 1, the power unit generally comprises a main engine 10, an independent auxiliary engine 11 which is provided to drive a blower 12 and a control 58 for the auxiliary engine under the regulation of the driver or operator. The delivery of the blower 12 is conveyed by a duct 13 to the induction system 14 of the main engine 10 the blower output being varied by regulating the auxiliary engine 11. The main engine 10 is connected to the driving wheels of the locomotive (such as 15) through the medium of a fluid coupling 16 of known construction and operation, the output shaft 17 thereof being connected to the driving wheels by a transmission gearing 18, a transmission shaft 19, a reversing gear indicated at 20, gearing 21 and the wheel axle 22. The main engine 10 is provided with a fuel-air mixture-control which automatically adjusts the fuel supply to the main engine so that it accords with the boost pressure of the blower 12 said mixture control being operated by the pressure in the main engine air inlet. Similarly an ignition timing control may be provided so that the igition timing of the enigne 10 is varied to accord with the boost pressure as well as in accordance with the speed of rotation of the said engine. Such devices are described in greater detail below, in relation to Figure 3.

From the above it will be appreciated that the main engine 10 is not under the direct mechanical control of the driver but that its operation is determined by the output of the blower 12 which is varied by the driver of the locomotive adjusting the power output of the auxiliary engine, a suitable control 58 (see Figure 3) being provided for this purpose.

With the arrangement described, when the locomotive is stationary both the main and auxiliary engines are idling and the blower is supplying a comparatively small quantity of air to the main engine. The fuel-supply to the main engine is accordingly adjusted so that the engine rotates at a low speed. In these circumstances the fluid coupling is slipping to its maximum extent so that no drive is transmitted from the main engine to the locomotive driving wheels. Upon the driver opening up the auxiliary engine its speed, and accordingly the blower output, is increased. At the same time the automatic mixture-control will adjust the fuel-supply to the main engine so that it accords with the increased quantity of air passing to the latter. The ignition timing is appropriately adjusted in a similar manner. As a result of the increased output of the blower and the increased fuel-supply to the main engine, the torque of the latter increases. As the torque of the main engine increases the slip of the fluid coupling is reduced and torque is transmitted to the driving wheels of the locomotive.

The auxiliary engine at its full power and speed makes available to the main engine a constant supply of air independently of the main engine or locomotive speed so that the main engine can be heavily supercharged at low locomotive speeds. The pressure of supercharge, however, falls away as the locomotive speed increases. The point at which the pressure of supercharge falls away is selected to coincide with the transmission of torque through the fluid coupling with the minimum of slip. This point corresponds to the minimum speed of the running speed range referred to above so that within the speed range the main engine is operatively coupled to the driving wheels of the locomotive. Within said range the torque of the main engine and the speed of the locomotive is varied by regulating substantially the power output of the auxiliary engine as this determines the boost pressure applied to the main engine. Furthermore with this form of power unit and control, the main engine will develop a constant power within the operating speed range, the torque applied to the driving wheels of the locomotive being variable within said range by regulating the auxiliary engine.

It is preferred that the auxiliary engine be provided with its own starter 55 (for example, electric) the main engine being started by the auxiliary engine. Moreover any auxiliaries such as a generator 56 and a vacuum exhauster 57 which might be required to provide services in the locomotive or the train to which it is coupled would preferably be driven off the auxiliary engine so as to allow the full torque available from the main engine to be used to drive the locomotive.

In the arrangements described above, it will be understood that below the running speed of the main engine the fluid coupling does not transmit full torque. This means that if the locomotive is geared to run at a high maximum speed, the period from starting over which the fluid coupling will slip can become excessive since it cannot be conveniently arranged for the coupling to transmit full torque at much less than one third of the full main engine speed. In this way although the full torque of the engine is required to start the train from rest and at low rail speeds nevertheless the full power of the main engine is not utilized at the rail until the train reaches a speed corresponding to the lower limit of the main engine running speed range. To minimize this waste of power the power unit shown in Figure 2 has been provided. Referring to this figure the power unit comprises a pair of main engines 10a, 10b and a single associated auxiliary engine 11 which drives a blower 12 which supplies by means of the duct 13 and induction systems 14a, 14b the pair of main engines 10a, 10b. The output shaft of each main engine is connected to a fluid coupling 16a, 16b and thence to a simple differential gear generally indicated by the reference numeral 23 the planet carrier 24 of said differential being connected with the locomotive driving wheels 15 through the transmission system described with reference to Figure 1.

The main engine 10a, here regarded as a homogeneous charge engine, is provided with a fuel-air mixture control 50a which is actuated through a linkage 51a from a pressure-sensitive device 52a responsive to the pressure in the main engine air inlet and which automatically adjusts the mixture supply to the main engine so that it accords with the boost pressure at the air inlet to this engine. Similarly an ignition timing control 53a is provided which is also actuated through a linkage 54a from the pressure sensitive device 52a, so that the ignition timing of the engine 10a is also varied to accord with the boost pressure at the air inlet.

It will be understood that the main engine may be either of the homogeneous charge type or of the compression ignition type, and although in any particular locomotive both the engines 10a and 10b will generally be of the same type, in the present instance the engine 10b is shown as of the compression ignition type purely for the purpose of illustrating in one drawing the auxiliaries of the two different types of engine. Thus the engine 10b is provided with a fuel injection pump 50b which is actuated through a linkage 51b from a pressure-sensitive device 52b to vary the quantity of fuel injected in dependence upon the boost pressure at the air inlet to this engine. If desired the timing of the fuel injection can also be varied in dependence upon the boost pressure through a linkage 54b.

The capacity of the blower 12 is such that at the maximum power of the auxiliary engine 11 sufficient air is supplied to the main engines 10a, 10b to maintain both of them at full rated horsepower. The control system for the power unit shown in Figure 2 is diagrammatically illustrated in Figure 3 and comprises for each main engine 10a, 10b an air throttle 25a, 25b disposed in that portion of the duct 13 which leads to the associated induction system, the arrangement being that if one main engine is throttled it continues to operate idly whilst the other engine is responsive to the blower delivery, its air throttle being correspondingly opened. At starting, one main engine may be highly supercharged whilst the other is idling, the operating engine being adapted to provide a starting torque up to the limit of adhesion.

In Figure 3 the air throttle 25a is shown open with the main engine 10a operative and responsive to the delivery of the blower 12 whilst air throttle 25b is shown closed so that its associated engine 10b is idling.

The fluid couplings 16a, 16b are each associated with a brake-drum, the output shaft 17a or 17b of each fluid coupling being connected to a corresponding brake-drum 26a or 26b and the latter in turn being connected by means of the shaft 27a or 27b with the differential gear 23. Associated with each brake-drum 26a, 26b is a brake band 28a or 28b. With such an arrangement when either brake band 28a or 28b is applied to its associated brake-drum the output shaft of the associated fluid coupling will be held stationary. Referring to Figure 3, if the brake band 28b is applied to the drum 26b so that the output side of the fluid coupling 16b is held stationary as described above, and the main engine 10a is supplied with a supercharge of air as described above, then the engine 10a will transmit through its associated fluid coupling 16a and the differential gear 23 to the driving wheels 15 and the full-load torque of fluid coupling 16a will be reached at half the locomotive speed of the direct drive arrangement described above with reference to Figure 1.

The load is applied to each brake band 28a, 28b by a spring 29a or 29b and is capable of being nullified by hydraulic pressure applied to one or the other of the control cylinders 30a, 30b, each of which carries a piston 31a or 31b against which one end of the corresponding spring 29a or 29b abuts. Pressure fluid is supplied to the cylinders 30a, 30b from the lubricating system of its associated main engine, the supply of pressure fluid to each cylinder being regulated by a rotary valve 32a or 32b.

As shown in Figure 3 pressure fluid passes from the main engines to the valves 32a, 32b and hence to the control cylinders 30a, 30b by way of pipe lines 33a, 33b. The air throttles 25a, 25b are each urged towards the closed position by a spring 34a or 34b which is carried within a cylinder 35a or 35b the piston 36a or 36b of which is connected by a link 37a or 37b to the corresponding air throttle 25a or 25b. Each cylinder 35a, 35b is supplied with pressure fluid from the lubrication system of its associated main engine, the admission of pressure fluid to the cylinders 35a, 35b being effective against the pressure of the springs 34a, 34b to open the air throttles 25a, 25b. As is clear from Figure 3, the admission of pressure fluid to cylinders 30a, 30b and 35a, 35b is simultaneously controlled by the associated valves 32a, 32b.

The valves 32a, 32b are interconnected by a rod 38 and are adjustable by means of a hand lever 39 which is under the control of the locomotive driver. With the hand lever 39 in the position shown in Figure 3 valve 32a is set to permit pressure fluid to pass to cylinders 30a and 35a and as a consequence air throttle 25a is open and the brake band 28a disengaged from the brake-drum 26a. The drive to the locomotive wheels is therefore by means of the main engine 10a as described above. With this setting of the valve 32a, the valve 32b is set so as to close pipe 33b and connect the cylinders 30b and 35b to an exhaust pipe 40b. As a consequence the spring 34b adjusts its associated air throttle 25b to the closed position (and engine 10b idles) and spring 29b applies brake band 28b to brake-drum 26b. Engine 10b therefore does not transmit power to the driving wheels of the locomotive.

In the event that hand lever 39 is set to the position indicated at 39a, the valve 32a will be set to connect cylinders 30a, 35a with the exhaust pipe 40a, whilst the valve 32b will be set to permit pressure fluid to pass from the lubricating system of engine 10b to cylinders 30b, 35b. The effect will be that engine 10a idles whilst engine 10b is operating. When the hand lever 39 is set to position 39c both air throttles 25a, 25b will be open and both brakes in their inoperative position. As a consequence both main engines 10a, 10b will transmit power to the driving wheels of the locomotive.

With the control arrangement described with reference to Figure 3, in the event of failure of one of the main engines 10a, 10b the oil pressure in the lubricating system falls to zero and as a result said engines will be rendered automatically inoperative. This will also occur in the event that the lubricating system of the main engine fails through any cause. Such an arrangement will also prevent one main engine from driving the other main engine backwards under any circumstances.

In the embodiment of the invention shown in Figure 4 a pair of power plants as described with reference to Figure 2 is provided in a locomotive and the transmission shafts 19a, 19b, associated with each power unit are connected to a differential gear generally indicated by the reference numeral 41. The planet carrier 42 of the differential gear 41 is connected with the locomotive driving wheels 15 by means of a gear 43, the reversing gear 20, gear 21 and the axle shaft 22. With such an arrangement if one main engine only is permitted to drive through its associated fluid coupling to the associated transmission shaft 19 and hence through the differential gear 41 to the locomotive driving wheels full-power torque from said fluid coupling will be reached at a locomotive speed which is one quarter of the minimum value of the running speed range for the direct drive arrangement described with reference to Figure 1. In the embodiment shown in Figure 4 the control system shown in Figure 3 is suitably adapted so that one, two, or all the main engines may transmit their drive to the driving wheels of the locomotive.

What I claim as my invention and desire to secure by Letters Patent is:

1. A power unit for a locomotive comprising in combination at least two main internal combustion engines, transmission mechanism from each engine through which the wheels of the locomotive are driven, each transmission mechanism including a fluid coupling, means for braking the output member of said coupling, and a differential gear through which the torque is transmitted from each of the said main engines to the driving wheels, an auxiliary internal combustion engine, a blower driven by the said auxiliary engine and supplying air to each of the said main engines, and means operating in connection with said braking means for controlling the air delivery to the said main engines whereby the power developed by the said main engines is maintained substantially constant throughout their running speed range and the engine torque diminishes as the speed increases within the said range.

2. A power unit for a locomotive including in combination two power units each comprising the parts as set out in claim 1 and including in the transmission a common differential gear through which the torque is transmitted to the driving wheels from a differential gear in the transmission from each main engine.

3. A power unit for a locomotive comprising in combination at least two main internal combustion engines, a throttle valve for each engine, transmission mechanism from each engine through which the wheel of the locomotive are driven, each transmission mechanism including a fluid coupling, means for braking the output member of the said coupling, and a differential gear driven through each of said fluid couplings through which the torque is transmitted from each of the said main engines to the driving wheels, an interconnection between the said throttle of each of the said main engines and the said braking means associated with the fluid coupling in the transmission mechanism of each engine, so that when the throttle is set for an engine to idle the said braking means will be operative on the output member of the fluid coupling, an auxiliary internal combustion engine, a blower driven by the said auxiliary engine and supplying air to each of the said main engines, and means operating in connection with said braking means for controlling the air delivery to the said main engines whereby the power developed by the said main engines is maintained substantially constant throughout their running speed range and the engine torque diminishes as the speed increases within the said range.

4. A power plant comprising the parts as set out in claim 3 and including a spring tending to move towards its closed position the said throttle of each of the said main engines and a spring tending to apply the braking means associated with the fluid coupling in the transmission mechanism of each engine, and means actuated by fluid pressure and operative in opposition to said springs to open the throttle and at the same time to release the braking means associated with the transmission of each of the said engines.

5. A power unit for a locomotive comprising in combination at least two main internal combustion engines, a throttle valve for each engine, transmission mechanism from each engine through which the wheels of the locomotive are driven, each transmission mechanism including a fluid coupling, means for braking the output member of each of said couplings, and a differential gear driven through each of said fluid couplings through which the torque is transmitted from each of the said main engines to the driving wheels, spring actuated means tending to close the said throttle of each of the said main engines, spring actuated means tending to apply the brake to the said fluid coupling in the transmission mechanism associated with each main engine, fluid pressure means operative in opposition to the said spring means to open the throttle, and at the same time to release the brake, in the said transmission of each engine, means for controlling simultaneously the said fluid pressure means with respect to the said throttle and brake operating means for each engine so that while one of the said main engines can have its throttle closed and its brake applied and the other main engine at the same time can have its throttle open and its brake released on the other hand by actuation of the said controlling means the throttles of each engine can be simultaneously opened and the brake of each engine released, an auxiliary internal combustion engine, a blower driven by the said auxiliary engine and supplying air to each of the said main engines, and means operating in connection with said braking means for controlling the air delivery to the said main engines whereby the power developed by the said main engines is maintained substantially constant throughout their running speed range and the engine torque diminishes as the speed increases within the said range.

6. A power unit comprising the parts as set out in claim 5 and including ignition means for each main engine, a control member for adjusting the timing of said ignition means, motion transmitting means responsive to the output of said blower, and an operative connection between said motion transmitting means and said control member adapted to adjust the ignition timing of said engines in dependence upon the output of said blower.

7. A power unit for a locomotive comprising in combination at least one pair of main engines, transmission mechanism through which the wheels of the locomotive are driven by one or both of the said main engines, the transmission mechanism including a fluid coupling associated with each of the said main engines, an auxiliary internal combustion engine, a blower driven by the said auxiliary engine and supplying air to both the said main engines, means for controlling the said auxiliary engine and thereby the air delivered to the said main engines whereby the power developed by the said main engines is maintained substantially constant throughout the running speed of the engines and the engine torque diminishes as the speed increases within the said range, means for applying a brake to the output member of each of the said fluid couplings so as to hold that member against rotation, and a differential gear driven through each of the said fluid couplings, said differential gear being included in the said transmission mechanism.

LOUIS FREDERICK RUDSTON FELL.

References Cited in the file of this patent
UNITED STATES PATENTS

| Number | Name | Date |
| --- | --- | --- |
| 987,802 | Henderson | Mar. 28, 1911 |
| 1,868,130 | Bauer et al. | July 19, 1932 |
| 1,978,172 | Sinclair | Oct. 23, 1934 |
| 1,993,983 | Woodward | Mar. 12, 1935 |
| 2,106,843 | Hahn | Feb. 1, 1938 |
| 2,134,742 | Stanton | Nov. 1, 1938 |
| 2,187,737 | Gregory | Jan. 23, 1940 |
| 2,197,179 | Hersey | Apr. 16, 1940 |
| 2,223,715 | Berger | Dec. 3, 1940 |
| 2,403,398 | Reggio | July 2, 1946 |
| 2,421,496 | Grieshaber et al. | June 3, 1947 |
| 2,428,457 | Hines | Oct. 7, 1947 |